United States Patent
Yamazaki

(10) Patent No.: US 8,149,885 B2
(45) Date of Patent: Apr. 3, 2012

(54) FIBER LASER PROCESSING APPARATUS

(75) Inventor: Nobuyuki Yamazaki, Noda (JP)

(73) Assignee: Miyachi Corporation, Chiba-ken (JP)

(*) Notice: Subject to any disclaimer, the term of this patent is extended or adjusted under 35 U.S.C. 154(b) by 0 days.

(21) Appl. No.: 13/093,228

(22) Filed: Apr. 25, 2011

(65) Prior Publication Data

US 2011/0194573 A1    Aug. 11, 2011

Related U.S. Application Data

(62) Division of application No. 12/484,579, filed on Jun. 15, 2009, now Pat. No. 7,953,126.

(30) Foreign Application Priority Data

Jun. 17, 2008    (JP) .................................. 2008-157779

(51) Int. Cl.
*H01S 3/30* (2006.01)
(52) U.S. Cl. ........ 372/6; 372/25; 372/29.01; 372/38.02; 372/38.07

(58) Field of Classification Search ................. 372/6, 25, 372/29.01, 38.02
See application file for complete search history.

(56) References Cited

U.S. PATENT DOCUMENTS

| | | | | |
|---|---|---|---|---|
| 6,489,985 B1* | 12/2002 | Brodsky et al. | ................ | 347/247 |
| 2005/0098708 A1* | 5/2005 | Yanagisawa et al. | ......... | 250/205 |
| 2010/0189136 A1* | 7/2010 | Gapontsev et al. | ................ | 372/6 |

* cited by examiner

*Primary Examiner* — Dung Nguyen
(74) *Attorney, Agent, or Firm* — Wenderoth, Lind & Ponack, L.L.P.

(57) ABSTRACT

A fiber laser processing apparatus controls a LD drive current $I_{LD}$ in a power feedback control mode (FIG. 3E) such that output of a fiber laser beam FB rises substantially from zero or a value around zero to a preceding level having no substantial effect on laser processing and arrives at a desired level ($P_A$) for the laser processing from a preceding level $P_B$ after a first time period (preceding pulse width $T_B$) has elapsed (time point $t_2$ of FIGS. 3A to 3F) from the start of the rising to the preceding level (time point $t_1$ of FIGS. 3A to 3F), and this may effectively prevent occurrence of a high-peak pulse HP at the rising edge of the fiber laser beam FB (FIG. 3F).

3 Claims, 5 Drawing Sheets

FIBER LASER PROCESSING APPARATUS

This is a Rule 1.53(b) Divisional of Ser. No. 12/484,579, filed Jun. 15, 2009 now U.S. Pat. No. 7,953,126.

BACKGROUND OF THE INVENTION

1. Field of the Invention

The present invention relates to a fiber laser processing method and a fiber laser processing apparatus for applying a pulsed fiber laser beam generated with the use of fiber laser to an object to be processed to perform desired laser processing.

2. Description of the Related Art

Recently, a laser processing method utilizing fiber laser attracts attention. Since the fiber laser uses a very elongated core provided in an optical fiber as an active medium, a laser beam (fiber laser beam) with a narrower beam diameter and a smaller beam divergence angle may be oscillated and output. Since excitation light made entering into a fiber passes over the core a number of times and exhausts the excitation energy while that light is propagated through a long optical path, the fiber laser beam may be generated with very high oscillation efficiency. Since the fiber laser generates no thermal lens effect in the core of the fiber, a beam mode of the fiber laser beam is very stable.

In general, for fiber laser used in a fiber laser processing apparatus,
an oscillation optical fiber having a core doped with a rare-earth element is optically disposed between a pair of optical resonant mirrors; the core of the optical fiber is optically excited to reciprocate an oscillation light beam with a predetermined wavelength output from the end face of the core in the axial direction between the optical resonant mirrors a number of times for resonance and amplification; and a coherent laser beam is picked up from one of the optical resonant mirrors (partial reflection mirror or output mirror) to the outside. Normally, an optical lens is disposed between the fiber end face and the optical resonant mirror to converge (focus) the oscillation light beam reflected by the optical resonant mirror with the optical lens to return the light beam to the core end face of the oscillation optical fiber. To optically excite the core of the oscillation optical fiber, an LD end face excitation mode is employed by using a laser diode (LD) for an excitation light source and focusing and making the LD light (excitation light) incident on the core end face through the optical resonant mirror and the optical lens.

In the laser processing using a pulsed fiber laser beam, especially, the laser processing such as seam welding, cutting, and boring, a rising rate of an LD drive current is enhanced through performance improvement of an LD power source driving the excitation LD to increase a repetition frequency of the fiber laser beam and, for example, a repetition oscillation of about 5 kHz is enabled (see Japanese Patent Application Laid-Open Publication No. 2007-190566).

However, if an LD power source with the LD drive current having a higher rising rate is used for the laser processing using the pulsed fiber laser, a narrow pulse (high-peak pulse) HP with an abnormally high peak value may occur in the fiber laser beam at the rising edge although the pulsed LD drive current may be acquired with a wavelength in accordance with setting as shown in FIG. 5. The occurrence of such a high-peak pulse HP occurs may damage the core (core doped with a rare-earth element) of the oscillation optical fiber, which is an active medium of the fiber laser, and may also adversely affect processing performance/processing quality of applications using such a fiber laser beam.

To constrain the occurrence of the above high-peak pulse HP, a technique is considered to be effective that maintains the fiber laser in a low-power laser oscillation state by applying a constant base current to the LD power source while waiting the start of the laser processing after powering on a fiber laser processing apparatus. However, maintaining the fiber laser in a constant laser oscillation state has drawbacks of increasing power consumption and shortening the life of LD. Although the fiber laser beam has no risk of going out of the apparatus since a shutter blocks the optical path of the fiber laser beam in the apparatus during the waiting period, a risk to safety becomes problematic if the apparatus is handled by a user without knowing or inadvertently forgetting that the fiber laser is maintained in the laser oscillation state.

SUMMARY OF THE INVENTION

The present invention was conceived in view of the above problems of the conventional technologies and it is therefore the object of the present invention to provide a fiber laser processing method and a fiber laser processing apparatus that achieve the safety of a fiber doped with a rare-earth element and the stability of the laser processing quality by effectively preventing the occurrence of the abnormal high-peak pulse at the rising edge of the pulsed fiber laser beam while halting the laser oscillation during the waiting period when the laser processing is not executed.

To achieve the above object, the present invention provides a fiber laser processing method of supplying a pulsed LD drive current to a laser diode to generate pulsed excitation light, using the excitation light to excite a core of an oscillation optical fiber having the core doped with a predetermined rare-earth element to generate a pulsed fiber laser beam, and focusing and applying the fiber laser beam onto a process point of a processed object to perform desired laser processing, the method comprising controlling the LD drive current in a power feedback control mode such that the output of the fiber laser beam rises substantially from zero or a value around zero to a preceding level having no substantial effect on laser processing and arrives at a desired level for the laser processing from the preceding level after a first time period has elapsed from the start of the rising to the preceding level.

In the fiber laser processing method of the present invention, the output of the fiber laser beam is first stably raised in the power feedback control mode to such a preceding level that the laser processing is not substantially affected rather than raising from the initial value (zero or a value around zero) to the desired level for the laser processing at once in the laser pulse oscillation. By raising the output of the fiber laser beam once to a lower level as above, a probability of the spontaneous emission is increased higher than the induced emission and inverted distribution is kept at a lower level in the fiber laser. The output of the fiber laser beam is stably raised from the preceding level (the inverted distribution state of the lower level) to the desired level for the laser processing in the power feedback control mode. Since the increase in the inverted distribution state or the induced emission is not drastic, an abnormally high peak pulse is not generated at the rising edge. Since the laser oscillation is halted or suspended during the waiting period while the laser processing is not performed, this is also excellent in power consumption and safety.

In one preferred aspect of the present invention, immediately before the output of the fiber laser beam starts rising to the preceding level, the LD drive current is controlled in a current feedback control mode for a second time period such that the current value of the LD drive current becomes identical to a current reference value. According to this method, even if the laser output measuring unit has an error, the rising of the LD drive current may rapidly and stably be started with the power feedback control.

In one preferred aspect of the present invention, the output of the fiber laser beam has the desired level for the laser processing set within a range of 10 to 500 W and the preceding level set within a range of 5 to 10 W. Preferably, the first time period is set within a range of 0.2 to 0.8 ms. The second time period is set to time not causing a needlessly elongated repetition frequency, for example, within a range of 0.2 to 0.5 ms.

The fiber laser processing method of the present invention may preferably be applied to the laser processing such as seam welding, cutting, or boring using the fiber laser beam having the repetition frequency of 1 Hz to 5 kHz.

A first viewpoint of the present invention provides a fiber laser processing apparatus comprising a fiber laser oscillator that includes an oscillation optical fiber having a core doped with a predetermined rare-earth element to excite the core of the oscillation optical fiber with pulsed excitation light to oscillate and output a pulsed fiber laser beam; a laser emitting unit that focuses and applies the fiber laser beam onto a process point of a processed object; a laser diode for generating the excitation light; an LD power source unit that supplies a pulsed LD drive current to the laser diode; a reference pulse setting unit that sets a desired reference pulse of the output of the fiber laser beam for laser processing; a reference signal generating unit that couples and sequentially generates a preceding pulse with a level having no substantial effect on the laser processing and the reference pulse on the time axis as a reference signal for power feedback control related to the output of the fiber laser beam to start the reference pulse rising from a level of the rear end of the preceding pulse; a laser output measuring unit for measuring the output of the fiber laser beam; a comparing unit that compares a laser output measurement value acquired from the laser output measuring unit with the reference signal supplied from the reference signal generating unit to output a comparison error thereof; and a control unit that controls the LD drive current through the LD power source unit such that the comparison error output from the comparing unit is set to zero.

A second viewpoint of the present invention provides a fiber laser processing apparatus comprising: a fiber laser oscillator that includes an oscillation optical fiber having a core doped with a predetermined rare-earth element to excite the core of the oscillation optical fiber with pulsed excitation light to oscillate and output a pulsed fiber laser beam; a laser emitting unit that focuses and applies the fiber laser beam onto a process point of a processed object; a laser diode for generating the excitation light; an LD power source unit that supplies a pulsed LD drive current to the laser diode; a reference pulse setting unit that sets a desired reference pulse of the output of the fiber laser beam; a first reference signal generating unit that couples and sequentially generates a preceding pulse with a level having no substantial effect on laser processing and the reference pulse on the time axis as a first reference signal for power feedback control related to the output of the fiber laser beam to start the reference pulse rising from a level of the rear end of the preceding pulse; a laser output measuring unit for measuring the output of the fiber laser beam; a first comparing unit that compares a laser output measurement value acquired from the laser output measuring unit with the first reference signal supplied from the first reference signal generating unit to output a comparison error thereof; a second reference signal generating unit that generates a signal having a level fixed to a certain value as a second reference signal for current feedback control related to the LD drive current; a LD drive current measuring unit for measuring the current value of the LD drive current; a second comparing unit that compares an LD drive current measurement value acquired from the LD drive current measuring unit with the second reference signal supplied from the second reference signal generating unit to output a comparison error thereof; and a control unit that controls the LD drive current through the LD power source unit such that the second comparison error output from the second comparing unit is set to zero for a predetermined time period immediately before the first reference signal generating unit starts the rising of the preceding pulse, the control unit controlling the LD drive current through the LD power source unit such that the first comparison error output from the first comparing unit from when the first reference signal generating unit starts the rising of the preceding pulse.

Since the above apparatus configuration implements the fiber laser processing method of the present invention through the coordination and cooperation of the units, the same operational effect as the fiber laser processing method of the present invention may be achieved.

In one preferred aspect of the present invention, the LD power source unit includes a direct-current power source that outputs a constant direct-current voltage and a switching element connected to the direct-current power source in series with the laser diode. The control unit performs the switching control of the switching element depending on the comparison error in a pulse-width modulation mode.

With the above configurations and operations, a fiber laser processing method and a fiber laser processing apparatus of the present invention may achieve the safety of a fiber doped with a rare-earth element and the stability of the laser processing quality by effectively preventing the occurrence of the abnormal high-peak pulse at the rising edge of the pulsed fiber laser beam while halting the substantial laser oscillation during the waiting period when the laser processing is not executed.

DESCRIPTION OF THE PREFERRED EMBODIMENTS

Preferred embodiments of the present invention will now be described with reference to FIGS. 1 to 4.

Figure 1:
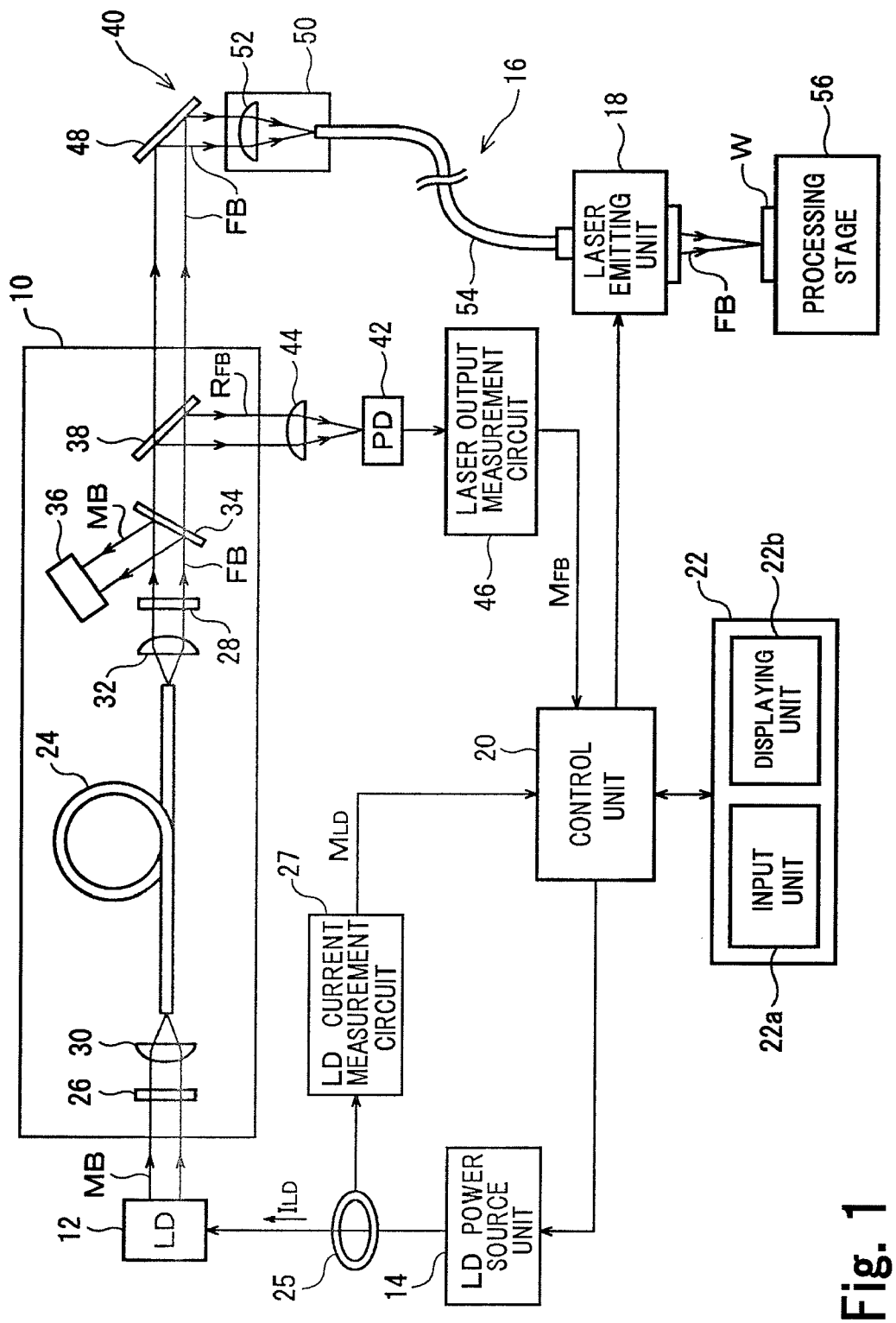
FIG. 1 is a diagram of a main configuration of a fiber laser processing apparatus according to one embodiment of the present invention.

FIG. 1 depicts a fiber laser processing apparatus of one embodiment of the present invention. The fiber laser processing apparatus is a laser processing machine applicable to the laser processing using a pulsed fiber laser beam, for example, seam welding, and is mainly made up of a fiber laser oscillator 10, an excitation LD 12, an LD power source unit 14, a fiber transmission system 16, a laser emitting unit 18, a control unit 20, a touch panel 22, etc.

The fiber laser oscillator 10 has an optical fiber for oscillation (hereinafter, "oscillation fiber") 24 and a pair of optical resonant mirrors 26, 28 optically opposing to each other through the oscillation fiber 24.

The excitation LD 12 is driven to emit light by a pulsed LD drive current $I_{LD}$ supplied from the LD power source unit 14 to oscillate and output pulsed LD light used for laser excitation (pumping) in the fiber laser oscillator 10, i.e., excitation light MB. The number of LD devices making up the LD 12 is arbitrary and the array configuration or the stack configuration may be employed. An optical lens 30 in the fiber laser oscillator 10 focuses and makes the excitation light MB from the LD 12 incident on one end face of the oscillation fiber 24. The optical resonant mirror 26 disposed between the LD 12 and the optical lens 30 is subjected to coating for transmitting the incident excitation light MB from the LD 12 and totally reflecting the incident oscillation light beam from the oscillation fiber 24 on the light axis.

A current sensor 25 and an LD current measurement circuit 27 are provided to measure the LD drive current $I_{LD}$ supplied from the LD power source unit 14 to the LD 12. The current sensor 25 is made up of a hall element, for example, and detects the LD drive current $I_{LD}$ without contact. The LD current measurement circuit 27 inputs the output signal of the current sensor 25 to calculate the current measurement value (e.g., current effective value) $M_{LD}$ of the LD drive current $I_{LD}$. The current measurement value $M_{LD}$ acquired by the LD current measurement circuit 27 is given as a feedback signal for feedback control to the control unit 20.

The oscillation fiber 24 has a core doped with a rare-earth element and a clad coaxially surrounding the core and uses the core as an active medium and the clad as a propagation optical path for the excitation light. The excitation light MB made incident on one end face of the oscillation fiber 24 as above is propagated through the oscillation fiber 24 while being by the total reflection from the circumferential boundary of the clad and passes over the core a number of times to optically excite the light emitting element in the core during the propagation. As a result, the oscillation light beams with a predetermined wavelength are emitted from both end faces of the core in the axial directions; the oscillation light beams are reciprocated between the optical resonant mirrors 26, 28 a number of times to be resonated and amplified; and a pulsed fiber laser beam FB with the predetermined wavelength is picked up from the one optical resonant mirror 28 made up of a partial reflection mirror.

An optical lens 32 in the fiber laser oscillator 10 collimates the oscillation light beams emitted from the end faces of the oscillation fiber 24 into parallel light to transmit the parallel light to the optical resonant mirror 28 and focuses the oscillation light beams reflected and returned from the optical resonant mirror 28 onto the end faces of the oscillation fiber 24. The excitation laser beam MB passing through the oscillation fiber 24 is transmitted through the optical lens 32 and the optical resonant mirror 28 and is turned back by a reflecting mirror 34 toward a laser absorber 36 in a lateral direction. The fiber laser beam FB output from the optical resonant mirror 28 is transmitted straight through the reflecting mirror 34, passes through a beam splitter 38, and then enters a laser incident unit 40 of the fiber transmission system 16.

The beam splitter 38 reflects a portion (e.g., 1%) of the incident fiber laser beam FB in a predetermined direction, i.e., toward a light receiving element for power monitoring, for example, a photodiode (PD) 42. A condenser lens 44 may be disposed in front of the photodiode (PD) 42 to condense the reflected light or monitor light RFB from the beam splitter 38.

The photodiode (PD) 42 photoelectrically converts the monitor light RFB from the beam splitter 38 to output an electric signal (laser output measurement signal) representing the laser output (laser power) of the fiber laser beam FB. A laser output measurement circuit 46 obtains a laser output measurement value $M_{FB}$ of the fiber laser beam FB with an analog signal process based on the output signal of the photodiode 42. The laser output measurement value $M_{FB}$ obtained by the laser output measurement circuit 46 is given as a feedback signal for power feedback control to the control unit 20.

The fiber laser beam FB transmitted straight through the beam splitter 38 and entering the laser incident unit 40 is first turned back by a bent mirror 48 in a predetermined direction, then condensed by a condenser lens 52 in the incident unit 50, and made incident on obne end face of an optical fiber for transmission (hereinafter, "transmission fiber") 54 of the fiber transmission system 16. The transmission fiber 54 is made up of an SI (step-index) fiber and transmits the incident fiber laser beam FB in the incident unit 50 to the laser emitting unit 18.

The laser emitting unit 18 includes, for example, galvanometer scanner and an fθ lens and turns a movable mirror of the galvanometer scanner to a predetermined angle under the control of the control unit 20 to focus and apply the fiber laser beam FB onto a process point on a surface of a processed object W on a processing stage 56.

If the seam welding is performed in this fiber laser processing apparatus, the pulsed LD drive current $I_{LD}$ having a waveform controlled by the LD power source 14 is supplied (injected) to the LD 12 and the LD 12 generates the excitation light MB having a pulsed LD output waveform corresponding to the waveform of the LD drive current $I_{LD}$. The excitation light MB is supplied (injected) to the oscillation fiber 24 in the fiber laser oscillator 10 through the end face excitation mode and the fiber laser oscillator 10 oscillates and outputs the fiber laser beam FB having a pulsed laser output waveform corresponding to the LD output waveform. The fiber laser beam FB having the waveform controlled is focused and applied onto the process point on the processed object W through the fiber transmission system 16 and the laser emitting unit 18. At the process point, processed material is melted by the energy of the fiber laser beam FB and solidified after the end of the pulse irradiation to form a nugget. The above operation is repeated at a preset repetition frequency while the laser emitting unit 18 scans the beam application position (process point) on the processed object W along a predetermined seam welding line at a constant rate.

The control unit 20 includes a CPU (microcomputer) as described later and controls the whole apparatus and the units in accordance with various programs (software) stored in a program memory. Particularly, for the waveform control of the laser output of the fiber laser beam FB, the control unit 20 sets and inputs a reference pulse desired by users (such as workers and maintenance personnel) through an input unit 22a and a displaying unit 22b of the touch panel 22.

Figure 2:
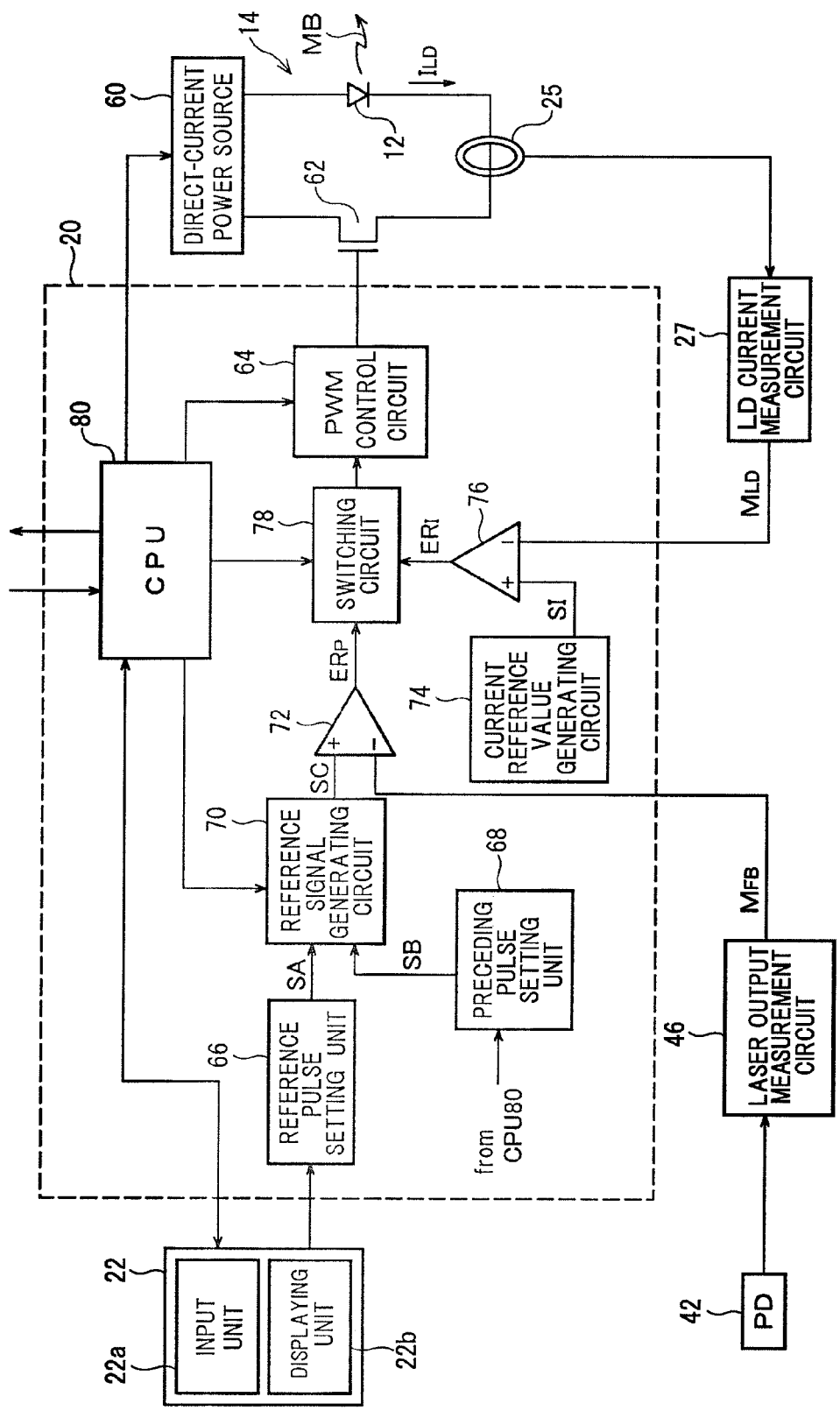
FIG. 2 is a block diagram of a configuration in a control unit of the fiber laser processing apparatus of the embodiment.
Figure 3:
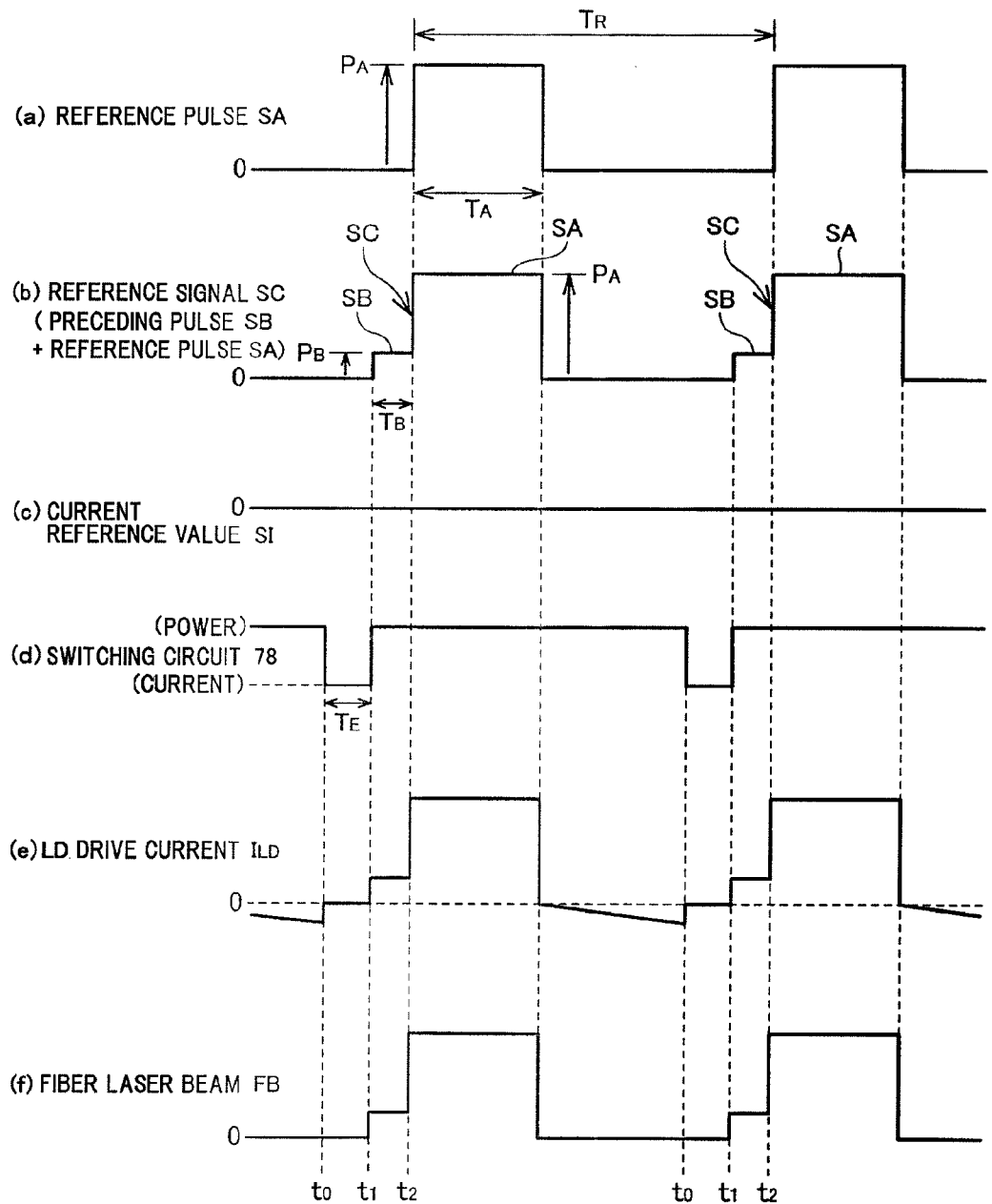
FIGS. 3A to 3F are waveform diagrams of waveforms of and timings between main pulses in the fiber laser processing apparatus of the embodiment.

FIG. 2 depicts configurations of the LD power source unit 14 and the control unit 20 of this embodiment. FIG. 3 depicts waveforms of and timings between main pulses in the fiber laser processing apparatus of this embodiment.

As shown in FIG. 2, the LD power source unit 14 includes a direct-current power source 60 that outputs a constant direct-current voltage and a switching element (e.g., power FET) 62 connected to the direct-current power source 60 in series with the LD 12.

The control unit 20 has a PWM control circuit 64 that drives the switching element 62 of the LD power source unit 14 to perform the switching operation in the PWM (pulse-width modulation) mode, a reference pulse setting unit 66 for the power feedback control system, a preceding pulse setting unit 68, a reference signal generating circuit 70 and a comparator 72, a reference signal generating circuit 74 for the current feedback control system, and a comparator 76, a switch circuit 78 for switching the feedback signal, and a CPU (microcomputer) that performs the control of the units and the overall control.

In the power feedback control system, the reference pulse setting unit 66 loads data of a desired pulse waveform itself or waveform parameters input by a user through the touch panel 22 to set the reference pulse SA for the output of the fiber laser beam FB and sets and registers the reference pulse SA in a form of storing the loaded pulse waveform data or the waveform parameter data into a memory in a predetermined format. For example, if the reference pulse SA has a rectangular wave as shown in FIG. 3A, values of a pulse width $T_A$, a peak power $P_A$, and a cycle $T_R$ are set as the waveform parameter data of the reference pulse SA.

Generally, in the laser processing using the fiber laser beam of the repetition pulse oscillation, the pulse width $T_A$ is set within a range of 1 to 100 ms; the peak power $P_A$ is set within a range of 10 to 500 W; and the cycle $T_R$ is set within a range of 0.2 to 1 sec (repetition frequency: 1 Hz to 5 kHz).

The preceding pulse setting unit 68 retains data of a pulse waveform itself or waveform parameters for the preceding pulse SB to be coupled to the reference pulse SA. For example, if the preceding pulse SB has a rectangular wave as shown in FIG. 3B, values of a pulse width $T_B$ and a peak power, i.e., preceding level $P_B$ are set as the waveform parameter data of the preceding pulse SB.

Typically, the preceding pulse SB may be set as an apparatus function for preventing the occurrence of the high-peak pulse in a control program. However, the waveforms or parameters of the preceding pulse SB may be configured to be set or adjusted as needed through the touch panel 22.

The reference pulse setting unit 66 and the preceding pulse setting unit 68 may be configured as a portion of the function of the CPU 80.

Figure 4:
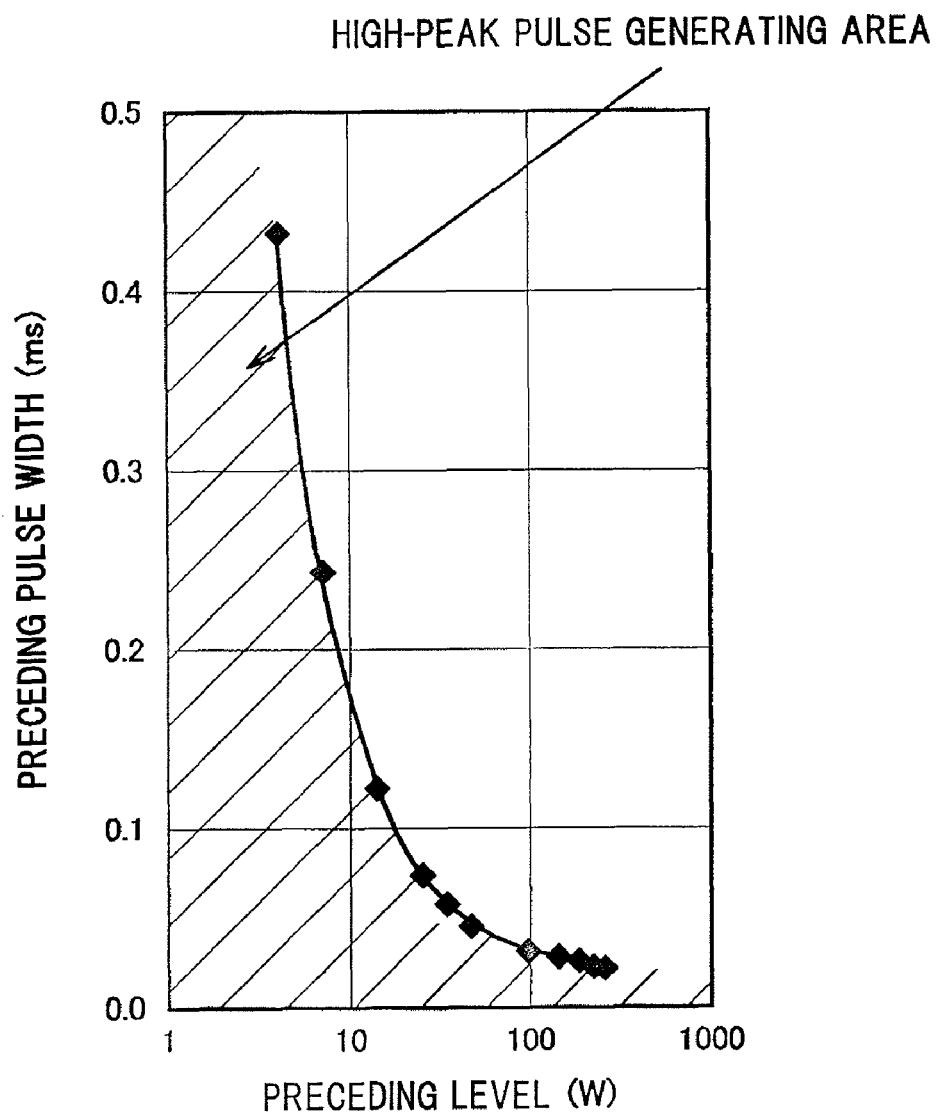
FIG. 4 is a graph of preceding levels of a preceding pulse and critical points of a preceding pulse width capable of preventing occurrence of a high-peak pulse in the fiber laser processing apparatus of the embodiment.
Figure 5:
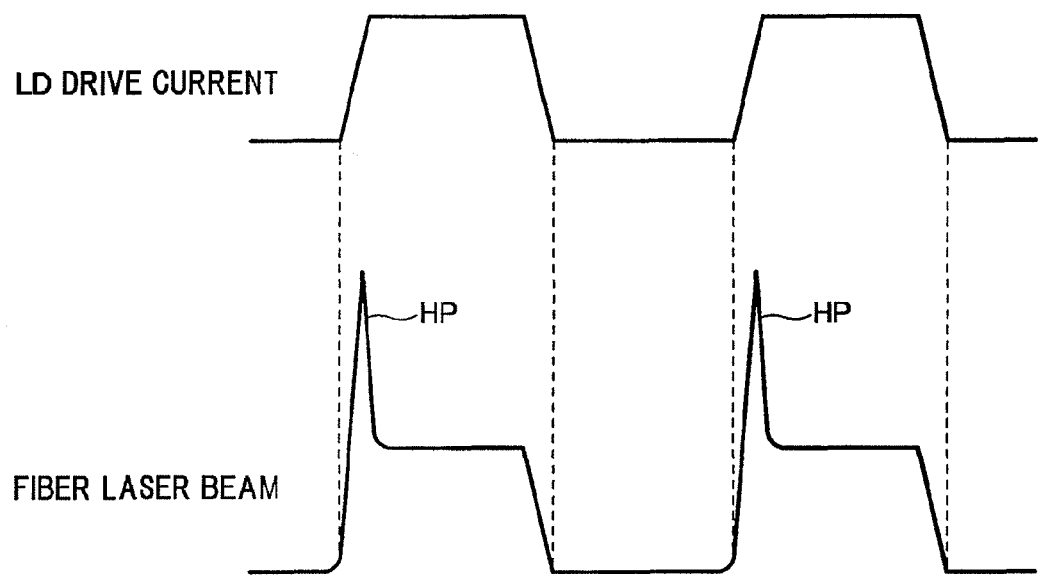
FIG. 5 is a waveform diagram of a high-peak pulse phenomenon found in a conventional fiber laser processing apparatus.

In the present invention, the characteristics of the preceding pulse SB, especially, the pulse width $T_B$ and the peak power (preceding level) $P_B$ are important parameters having an influence on whether the abnormal high-peak pulse HP occurs at the rising edge of the fiber laser beam FB (see FIG. 5). The inventor acquired a graph shown in FIG. 4 by plotting critical values when the high-peak pulse HP occurred in the fiber laser processing apparatus of the embodiment with the vertical axis and the horizontal axis defined as the pulse width $T_B$ and the preceding level $P_B$, respectively, of the preceding pulse SB. The points on this graph indicate the critical points of whether the high-peak pulse HP occurs if the reference pulse is coupled to the preceding pulse SB; the high-peak pulse HP occurred in the inner area (shaded area) of the graph; and the high-peak pulse HP did not occur in the outer area (shaded area). The peak power $P_A$ of the reference pulse SA is 500 W and the pulse width $T_A$ is 1 ms.

It is known from the graph of FIG. 4 that the high-peak pulse HP may be prevented by selecting the preceding pulse width $T_B$ of 0.5 ms or more when the preceding level $P_B$ of the preceding pulse SB is set to 5 W. It is known that the high-peak pulse HP may be prevented by selecting the preceding pulse width $T_B$ of 0.2 ms or more when the preceding level $P_B$ is set to 10 W. In general, the effect of preventing the occurrence of the high-peak pulse HP with the preceding pulse SB tends to become prominent when the preceding level $P_B$ is set higher and the preceding pulse width $T_B$ is set longer.

However, if the preceding level $P_B$ is too high, the intended laser processing regulated by the reference pulse SA is more likely to be affected. Of course if the preceding level $P_B$ is too low, the effect of preventing the occurrence of the high-peak pulse HP is reduced. On the other hand, if the preceding pulse width $T_B$ is too long, the apparent rising edge time of the preceding pulse SB is elongated and the repetition rate of the pulse oscillation is lowered. If the preceding pulse width $T_B$ is too short, the effect of preventing the occurrence of the high-peak pulse HP is reduced.

Therefore, the preceding level $P_B$ and the preceding pulse width $T_B$ of the preceding pulse SB must be set in suitable ranges. From the above viewpoint with reference to the graph of FIG. 4 and in consideration of the requested specifications, etc., of the actual laser processing, it is preferable that the preceding level $P_B$ is set within a range of 5 to 10 W and that the preceding pulse width $T_B$ is set within a range of 0.2 to 0.8 ms.

In FIG. 2, when the fiber laser processing apparatus generates the fiber laser beam FB of each pulse, the reference signal generating circuit 70 couples and outputs the preceding pulse SB from the preceding pulse setting unit 68 and the reference pulse SA from the reference pulse setting unit 66 in this order on the time axis as a reference signal (analog signal) SC for the power feedback control. The preceding pulse SB is first raised to the peak power (the preceding level) and the rising edge of the reference pulse SA is started at the preceding level ($P_B$) continuously from the rear end of the preceding pulse SB. To achieve the above function, the reference signal generating circuit 70 has a digital circuit that couples and combines the preceding pulse SB and the reference pulse SA and a digital-analog converter that converts the combined pulse into the analog signal (reference signal SC).

The reference signal SC output from the reference signal generating circuit 70 is input to one input terminal (+) of the comparator 72. To the other input terminal (−) of the comparator 72, the laser output measurement value $M_{FB}$ representative of real-time laser output of the fiber laser beam FB is input from the laser output measurement circuit 46. The comparator 72 compares levels of the both input signals SC and $M_{FB}$ to output an error signal $ER_P$ indicative of a comparison error. The error signal $ER_P$ is input through the switch circuit 78 to the PWM control circuit 64. The PWM control circuit 64 performs the switching control of the switching element 62 in the PWM mode such that a value of the error signal $ER_P$, i.e., the comparison error is set to zero.

As above, in this embodiment, the LD drive current $I_{LD}$ is controlled (FIG. 3E) in the power feedback control mode such that the output of the fiber laser beam FB rises substantially from zero or a value around zero to the preceding level $P_B$ having no substantial effect on the laser processing and arrives at the desired level ($P_A$) for the laser processing from the preceding level $P_B$ after a first time period (preceding pulse width $T_B$) has elapsed (time point t2 of FIGS. 3A to 3F) from the start of the rising to the preceding level $P_B$ (time point t1 of FIGS. 3A to 3F), and this may effectively prevent the occurrence of the high-peak pulse HP at the rising edge of the fiber laser beam FB (FIG. 3F). Therefore, the oscillation fiber 24 in the fiber laser oscillator 10 is prevented from being damaged due to the high-peak pulse HP. Since the fiber laser beam FB is applied to the processed object W with a pulse waveform conforming to the setting without the high-peak pulse HP, the seam welding processing may favorably be executed. Since the laser oscillation is halted or suspended during the waiting period when the laser processing is not executed, the embodiment is also excellent in power consumption and safety.

FIGS. 3E and 3F are only for the purpose of describing the operation of the present invention and are not intended to precisely depict the current value waveform of the LD drive current $I_{LD}$ and the laser output waveform of the fiber laser beam FB.

This embodiments includes the current feedback control system in addition to the power feedback control system as above. The LD drive current $I_{LD}$ flowing through the LD power source unit 14 is sensed by the current sensor 25 and the LD current measurement circuit 27 obtains the current measurement value $M_{LD}$ of the LD drive current $I_{LD}$. The current measurement value $M_{LD}$ from the LD current measurement circuit 27 is input to one input terminal (−) of the comparator 76 in the control unit 20 (FIG. 2). To the other input terminal (+) of the comparator 76, a predetermined current reference value SI is input from the current reference signal generating circuit 74. The current reference value SI may normally be set to zero amperes or a value around zero amperes. The comparator 76 compares values of the both input signals $M_{LD}$ and SI to output an error signal $ER_I$ indicative of a comparison error.

When generating the fiber laser beam FB of each pulse, the CPU 80 switches the switch circuit 78 to the current feedback control system, i.e., the comparator 76 only during a predetermined period $T_E$ (time points t0 to t1 of FIG. 3) immediately before the preceding pulse SB is raised. Therefore, the error signal $ER_I$ from the comparator 76 is input through the switch circuit 78 to the PWM control circuit 64 during the predetermined period $T_E$. The PWM control circuit 64 performs the switching control of the switching element 62 in the PWM mode such that a value of the error signal $ER_I$, i.e., the comparison error is set to zero. In this case, the LD drive current $I_{LD}$ having a current value of the current reference value SI flows through the LD power source unit 14. If the current reference value SI is set to zero amperes, the LD drive current $I_{LD}$ never flows apparently as is the case when the switching element 62 is turned off.

By applying the current feedback control immediately before the laser pulse oscillation to forcibly reset the LD drive current $I_{LD}$ to the current reference value SI, the current value of the LD drive current $I_{LD}$ corresponding to the reference signal SC (preceding pulse SB+reference pulse SA) and therefore the output of the fiber laser beam FB may rapidly and stably be raised in a reliable manner when the power feedback is applied. Therefore, the quality stability of the laser processing may further be improved.

Since the PWM control circuit 64 turns off the switching element 62 before the start of the laser pulse oscillation, the LD drive current $I_{LD}$ does not flow through the LD power source unit 14. However, if the laser output measuring unit (especially, the photodiode 42) has an error, the laser output measurement value $M_{FB}$ output from the laser output measurement circuit 46 may practically indicate a value other than zero even if no LD drive current $I_{LD}$ actually flows through the LD power source unit 14. In this case, since the value of the laser output measurement value $M_{FB}$ does not change (i.e., the value is not turned to zero) although the power feedback control system works to turn the laser output measurement value $M_{FB}$ to zero, the control value of the power feedback system is stuck at infinite and the laser pulse oscillation is started. As a result, the rapid and stable rising of the preceding pulse SB to the preceding level $P_B$ becomes difficult and, therefore, the rapid and stable rising of the reference pulse $P_A$ becomes difficult as well.

When the power feedback loop is operated before the start of the laser pulse oscillation without using the current feedback control, i.e., when the PWM control circuit 64 causes the switching operation of the switching element 62 such that the laser output measurement value $M_{FB}$ is set to zero, the output of the fiber laser beam FB does not set to zero and is substantially oscillated and output if the laser output measuring unit has an error as above. Therefore, it is not desirable to apply the power feedback control to operate the PWM control circuit 64 and the switching element 62 during the period while the reference signal generating circuit 70 does not generate the reference signal SC.

In the present invention, although the longer predetermined period $T_E$ (t0 to t1) of applying the current feedback is better from the viewpoint of effectiveness and stability of the feedback control, the shorter period is better from the viewpoint of acceleration of the repetition frequency and the viewpoint of power consumption and it is normally preferable to set the predetermined period $T_E$ within a range of 0.2 to 0.5 ms.

Although the preferred embodiment of the present invention has been described above, the above embodiment does not limit the present invention. Those skilled in the art may make various modifications and variations without departing from the technical concept and the technical range of the present invention in the specific embodiments.

For example, the waveforms of the reference pulse SA and the preceding pulse SB are not limited to a rectangular shape and may be set to an arbitrary shape, for example, a trapezoidal shape. Although the fiber laser processing method and apparatus of the present invention may particularly be applied to the laser processing using pulse laser from the repeated oscillation such as seam welding, cutting, and boring, the fiber laser processing method and apparatus may also be applied to laser processing using monopulse laser, for example, spot welding.

What is claimed is:

1. A fiber laser processing apparatus comprising:
   a fiber laser oscillator that includes an oscillation optical fiber having a core doped with a predetermined rare-earth element to excite the core of the oscillation optical fiber with pulsed excitation light to oscillate and output a pulsed fiber laser beam;
   a laser emitting unit that focuses and applies the fiber laser beam onto a process point of a processed object;
   a laser diode for generating the excitation light;
   an LD power source unit that supplies a pulsed LD drive current to the laser diode;
   a reference pulse setting unit that sets a desired reference pulse of the output of the fiber laser beam for laser processing;
   a reference signal generating unit that couples and sequentially generates a preceding pulse with a level having no substantial effect on the laser processing and the reference pulse on the time axis as a reference signal for power feedback control related to the output of the fiber laser beam to start the reference pulse rising from a level of the rear end of the preceding pulse;
   a laser output measuring unit for measuring the output of the fiber laser beam;
   a comparing unit that compares a laser output measurement value acquired from the laser output measuring unit with the reference signal supplied from the reference signal generating unit to output a comparison error thereof; and a control unit that controls the LD drive current through the LD power source unit such that the comparison error output from the comparing unit is set to zero.

2. A fiber laser processing apparatus comprising:

a fiber laser oscillator that includes an oscillation optical fiber having a core doped with a predetermined rare-earth element to excite the core of the oscillation optical fiber with pulsed excitation light to oscillate and output a pulsed fiber laser beam;

a laser emitting unit that focuses and applies the fiber laser beam onto a process point of a processed object;

a laser diode for generating the excitation light;

an LD power source unit that supplies a pulsed LD drive current to the laser diode;

a reference pulse setting unit that sets a desired reference pulse of the output of the fiber laser beam;

a first reference signal generating unit that couples and sequentially generates a preceding pulse with a level having no substantial effect on laser processing and the reference pulse on the time axis as a first reference signal for power feedback control related to the output of the fiber laser beam to start the reference pulse rising from a level of the rear end of the preceding pulse;

a laser output measuring unit for measuring the output of the fiber laser beam;

a first comparing unit that compares a laser output measurement value acquired from the laser output measuring unit with the first reference signal supplied from the first reference signal generating unit to output a comparison error thereof;

a second reference signal generating unit that generates a signal having a level fixed to a certain value as a second reference signal for current feedback control related to the LD drive current;

a LD drive current measuring unit for measuring the current value of the LD drive current;

a second comparing unit that compares an LD drive current measurement value acquired from the LD drive current measuring unit with the second reference signal supplied from the second reference signal generating unit to output a comparison error thereof; and a control unit that controls the LD drive current through the LD power source unit such that the second comparison error output from the second comparing unit is set to zero for a predetermined time period immediately before the first reference signal generating unit starts the rising of the preceding pulse, the control unit controlling the LD drive current through the LD power source unit such that the first comparison error output from the first comparing unit is set to zero from when the first reference signal generating unit starts the rising of the preceding pulse.

3. The fiber laser processing apparatus of claim 1, wherein the LD power source unit includes a direct-current power source that outputs a constant direct-current voltage and a switching element connected to the direct-current power source in series with the laser diode, and wherein the control unit performs the switching control of the switching element depending on the comparison error in a pulse-width modulation mode.

* * * * *